United States Patent [19]

Miyakawa

[11] Patent Number: 4,610,578
[45] Date of Patent: Sep. 9, 1986

[54] HOLE MACHINING DEVICE

[75] Inventor: Eiji Miyakawa, Tokyo, Japan

[73] Assignee: Miyakawa Industry Co., Ltd., Seki, Japan

[21] Appl. No.: 527,409

[22] Filed: Aug. 29, 1983

[51] Int. Cl.$^4$ ............................................. B23B 49/00
[52] U.S. Cl. ........................................ 408/13; 408/11; 408/16; 408/238
[58] Field of Search ....................... 408/10, 11, 13, 16, 408/8, 116, 133, 114, 238, 241, 242; 29/26 R, 26 A

[56] References Cited

U.S. PATENT DOCUMENTS

| | | | |
|---|---|---|---|
| 3,627,437 | 12/1971 | Smith | 408/16 |
| 3,652,099 | 3/1972 | Bilz | 408/16 X |
| 3,723,017 | 3/1973 | Bilz et al. | 408/16 |
| 3,989,405 | 11/1976 | Quackenbush | 408/11 |
| 4,030,853 | 6/1977 | Mizen | 408/10 |

Primary Examiner—Gil Weidenfeld
Assistant Examiner—Glenn L. Webb
Attorney, Agent, or Firm—Leydig, Voit & Mayer, Ltd.

[57] ABSTRACT

A hole machining device capable of effecting marking and similar operations as well as drilling and reaming. The device comprises driving shafts attached to the body of the machining device, spindles for installing the drills, springs for invariably urging the spindles forwardly, spindle collars that cover the springs and detecting means for detecting the backward movement of the collars.

3 Claims, 5 Drawing Figures

ID NO: 4,610,578

HOLE MACHINING DEVICE

FIELD OF THE INVENTION

The present invention relates to a hole machining device and, more particularly, to a device capable of effecting marking and similar operations as well as drilling and reaming using drills and reamers.

SUMMARY OF THE INVENTION

It is an object of the present invention to provide a device capable of effecting marking and similar operations in addition to drilling and reaming.

It is another object of the invention to provide a hole machining device which can invariably perform marking and reaming operations with certainty even when the distance from the tips of drills to a workpiece are not identical.

It is a further object of the invention to provide a hole machining device which can make markings of uniform depth.

It is a still other object of the invention to provide a hole machining device which can certainly make markings on a workpiece even if the workpiece is slightly distorted.

It is a yet other object of the invention to provide a hole machining device which can certainly make markings on a workpiece even if the tips of drills attached to the device are not aligned.

It is a still further object of the invention to provide a hole machining device having detecting devices that are more durable than contact switches.

It is a yet further object of the invention to provide a hole machining device which can effect spot welding and beveling operations using drills.

The foregoing and additional objects are attained in accordance with the principles of the invention by providing a hole machining device which comprises driving shafts attached to the body of the machining device, spindles for installing the drills, springs for invariably urging the spindles forwardly, spindle collars that cover the springs, and detecting means for detecting the backward movement of the collars.

Other objects and features of the invention will appear in the course of the description thereof which follows.

DETAILED DESCRIPTION OF THE INVENTION

Figure 1:
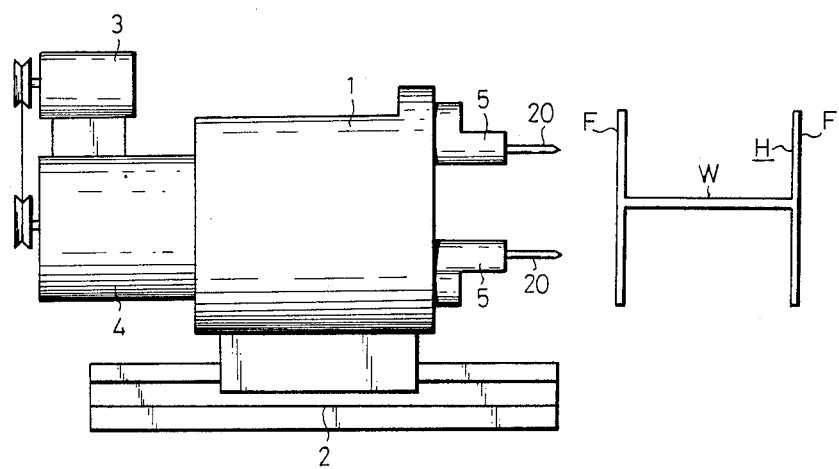
FIG. 1 is a schematic front elevation of a hole machining device embodying the concept of the present invention, and in which an H-beam is also shown.

Referring to the drawings, the body of a hole machining device embodying the concept of the present invention is indicated by reference numeral 1. The body 1 moves back and forth (to either side as viewed in FIGS. 1 and 2) on a guide rail 2. Positioned at the back of the body 1 of the device is an electric motor 3. Indicated by reference numeral 4 is a reduction gear.

Figure 3:
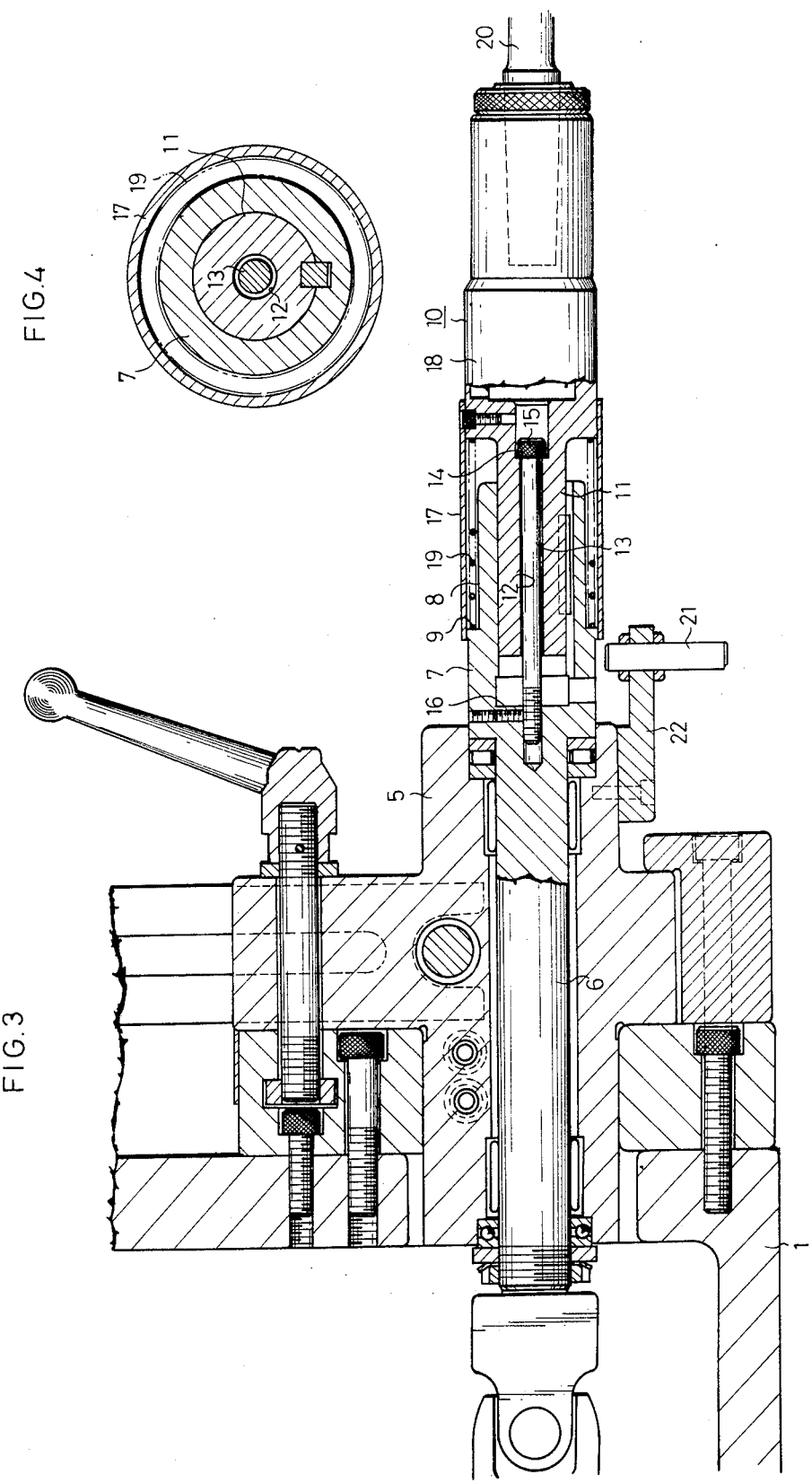
FIG. 3 is an enlarged elevation partially in section showing the spindle holders and the spindles of the body of the device shown in FIG. 2.

Upper and lower spindle holders 5 are mounted to the front surface of the body 1 such that their positions are vertically adjustable. Driving shafts 6 are rotatably supported by the pair of holders 5 as shown in FIG. 3, and are driven by the motor 3. Tubular portions 7 are formed at the front ends of the shafts 6 and project forwardly from the spindle holders 5. The outer periphery of each tubular portion 7 is provided with channels 8, each rear end of which is indented at 9.

A spindle 10 is mounted to each tubular portion 7 of the driving shafts 6 so that it may rotate together with the corresponding shaft. The ends of the bases of the spindles have reduced portions 11, which are inserted in the tubular portions 7 such that they can move back and forth. Each of the reduced portions 11 is formed with a longitudinal hole 12, into which a position limiting bolt 13 is loosely inserted from the front thereof. The front ends of the bolts are screwed to the inner ends of the tubular portions 7 of the shafts 6. Anchoring surfaces 14 formed at the front ends of the holes 12 can come into engagement with the heads 15 of the position limiting bolts 13. Set screws 16 screwed into the outer peripheries of the shafts 6 act to prevent the bolts 13 from getting unscrewed from the shafts 6.

Cylindrical collars 17 are installed over the respective reduced portions 11 of the spindles 10 and have base ends firmly secured to the rear ends of enlarged portions 18 of the spindles 10. The collars 17 extend over the tubular portions 7 of the shafts 6 to the back of the recessed portions 9. Coiled springs 19 interposed between the recessed portions 9 and the enlarged portions 18 of the spindles 10 urge the spindles 10 forward at all times. Drills 20 are installed to the respective spindles 10.

When a rearward thrust is applied to the front ends of the drills 20, the drills move back together with the spindles 10 against the resilience of the springs 19. At this time, the spindle collars 17 also recede together with the spindles 10.

Figure 5:
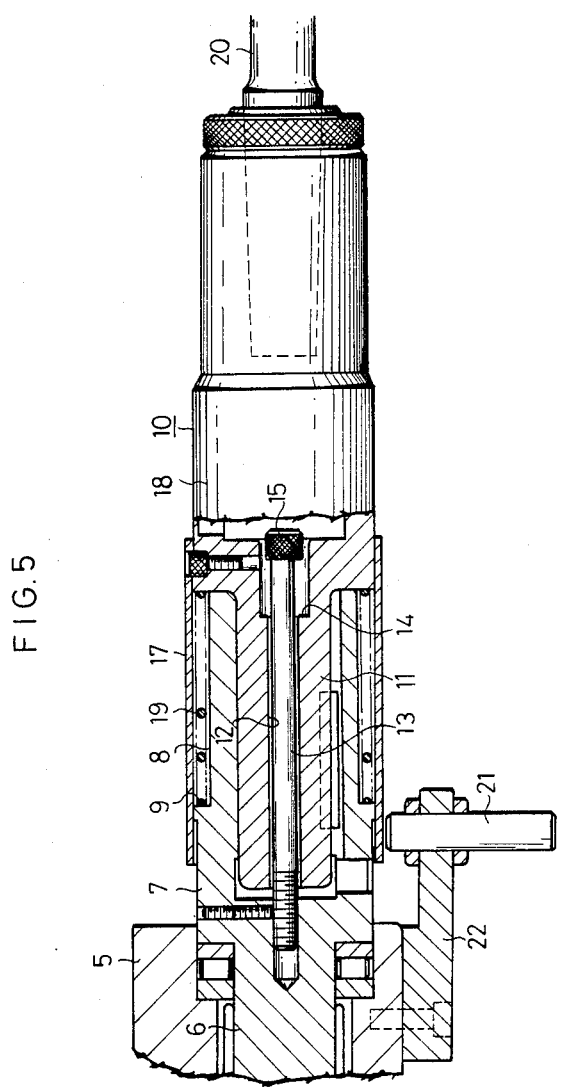
FIG. 5 is an enlarged elevation partially in section showing the condition in which the spindles of FIG. 3 have receded.

As shown in FIG. 5, a proximity switch 21 is so placed that it comes into close proximity to the rear end of the associated spindle collar 17 when the collar is in its most rearward position. The switch 21 is supported by a bracket 22 which is securely fixed to one portion of the associated spindle holder 5. When the switch 21 is turned on, the body 1 of the hole machining device is shifted from a high advance velocity state to a low advance velocity state, from an advance state to a standstill state, or from the standstill state to a receding state.

Figure 2:
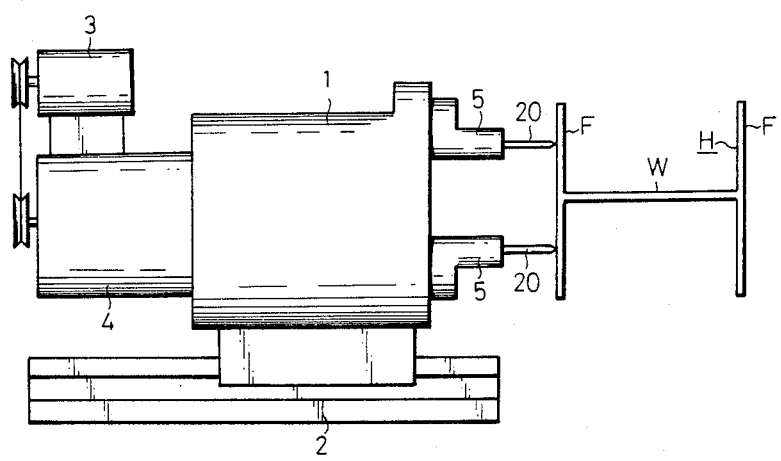
FIG. 2 is a schematic front elevation of the device of FIG. 1, for showing the condition in which the body of the device has been advanced.
Figure 4:
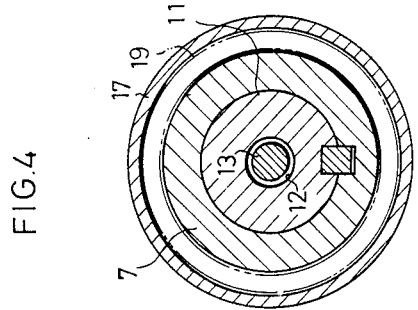
FIG. 4 is a cross-sectional view of the base portions of the spindles shown in FIG. 3.

In the operation of the hole machining device constructed as hereinbefore described, when a workpiece is to be pierced, the drills 20 are first rotated under the condition shown in FIG. 1. Then the body 1 of the device is moved forward by a hydraulic cylinder (not shown), so that the body 1 advances on the rail 2 at a relatively high velocity until the front ends of the drills 20 abut against the workpiece shown in the form of an H-beam H as shown in FIG. 2. Thus, no further advance of the drills 20 is allowed, and therefore the drills move back together with the spindles 10 relative to the body 1 in opposition to the resilience of the coiled springs 19 until the rear ends of the enlarged portions 18 abut against the front ends of the tubular portions 7 of the driving shafts 6 and are stopped. During the backward movement of the spindles 10 relative to the body 1, the spindle collars 17 also retreat together with the spindles while rotating with the result that the rear ends of the collars come close to the proximity switches 21, thereby turning them on. This switching operation precedes the engagement of the enlarged portions 18 of the spindles 10 with the tubular portions 7 of the driving shafts 6.

The aforementioned activation of the switches 21 operates the hydraulic circuit for advancing the body 1 of the device to shift the body from a high advance velocity to a low advance velocity. Then the body 1 is further advanced while the switches 21 remain activated, whereby the rear end surfaces of the enlarged portions 18 of the spindles 10 abut on the front ends of the tubular portions 7 of the shafts 6 as shown in FIG. 5. This causes the drills 20 to advance further to pierce flanges F of the H-beam H.

Upon piercing, the resilience of the coiled springs 19 move the drills 20 forward with a jerk, together with the spindles 10, and then these are moved toward their original positions. Simultaneously with this forward movement, the spindle collars 17 are also advanced and so the rear ends of the collars 17 forwardly move away from the respective switches 21, thus turning them off. Upon the forward jerk of the spindles 10, the anchoring surfaces 14 located forwardly of the holes 12 to which the bolts in the spindles are inserted come into engagement with the heads 15 of the position limiting bolts 13 to stop the forward movement. When the switches 21 are turned off, the body 1 is switched into a rearward movement operation after a lapse of a given time, which is set by a timer (not shown).

In the embodiment described above, after the workpiece is pierced through and the drills 20 are jerked forward, the body 1 of the machining device begins to withdraw. When holes or indents are made which do not extend through the workpiece but extend only to a certain depth of the workpiece, the timer is started in response to the activation of the switches 21 to allow a drilling operation for a given time set by the timer. After the set time, the body 1 of the machining device is withdrawn.

To make markings on the H-beam H by means of the above-described hole machining device, the body 1 of the device is advanced at a high velocity as described above so that the front ends of the drills 20 may abut against the flanges F of the H-beam H (FIG. 2), thereby turning on the proximity switches 21. This starts the backward movement of the body 1.

According to the construction mentioned above, the pressure applied to the flanges F by the drills 20 stems only from the resilience of the coiled springs 19 which pushes the spindles 10 forwardly. Consequently, this pressure is not so large as to pierce the flanges F of the H-beam H. Further, this force is applied only for the short time beginning with the engagement of the front ends of the drills 20 with the flanges F and ending with the activation of the switches 21 by the receding spindles 10. Thus, the tips of the drills 20 make markings on the flanges F by virtue of the aforementioned operation.

The marking operation is effected until the resilience of the coiled springs 19 turns the switches 21 on, thus forming a contrast to the prior art device in which spindles such as indicated by 10 are advanced during a given time set by a timer to make markings. The novel device provides markings of uniform depth. In addition, when a marking operation is effected as described above, even if the H-beam H is slightly twisted and if the flanges F are somewhat tilted in the lateral direction of the web w, the tips of the drills 20 abut on the flanges F with certainty. That is, the drills 20 as well as the body 1 of the machining device are not allowed to recede before the drills 20 abut on the flanges F and the whole device slightly moves backward. This assures accordingly that the body 1 of the machining device moves forwardly and a marking operation is effected until the drills 20 come into abutting engagement with the flanges F. Furthermore, when the plurality of drills 20 are used to impress a plurality of markings on the workpiece as in the case of the above embodiment, even if the drills 20 are different in length and hence the positions of their tips are not in line, all the drills attain marking operations with certainty by the action of the coiled springs 19.

Also, in the above embodiment, the proximity switches 21 which are used to detect the rearward movement of the spindles 10 are designed not to directly contact the rotating spindle collars 17, thus yielding an improved durability over contact switches.

It is to be understood that the above-mentioned hole machining device can be not only employed singly but also used as a multiple spindle piercer by combining together a plurality of such hole machining devices. Also, it is possible to effect spot facing and beveling using the drills 20, which can be replaced by spot facing bars. Additionally, it is possible to impress markings on the horizontal surfaces of the workpiece such as the web w of the H-beam H by causing the drills 20 to face downward. Further, limit switches can be used instead of the proximity switches 21.

As hereinbefore described in detail, the hole machining device according to the present invention comprises driving shafts 6 mounted to the body 1 of the machining device, spindles 10 acting to install drills 20 and supported by the shafts 6 so that they can move rearwardly and rotate with the shafts 6, springs 19 interposed between the spindles 10 and the driving shafts 6 to invariably urge the spindles 10 forward, spindle collars 17 covering the springs 19 and installed over the spindles 10, and detecting means for detecting the rearward movement of the spindle collars 17, whereby the machining device can not only effect drilling operation but also certainly perform marking and spot facing operations on a workpiece inclined backwardly or forwardly. In this way, the novel hole machining device is contributable to the industry.

While the invention has been particularly shown and described with reference to preferred embodiments thereof, it is to be understood that various changes and variations may be made therein without departing from the spirit and scope of the invention.

What is claimed is:

1. A hole machining device comprising:
driving shafts (6) mounted to the body (1) of the hole machining device,
spindles (10) acting to install drills (20) and supported by the shafts (6) so that the spindles can move longitudinally back and forth relative to the shafts while rotating together with the shafts (6),
means for rotating said driving shafts, whereby said spindles and drills are also rotated,
springs (19) interposed between the spindles (10) and the driving shafts (6) to invariably urge the spindles longitudinally (10) forward throughout the entire range of longitudinal movement of the spindles relative to the shafts, including the fully advanced positions of the spindles, said spindles being free for said longitudinal movement whenever the load on the spindles exceeds the opposing force of said springs, spindle collars (17) covering the springs (19) and installed over the spindles (10), said spindles collars being secured to said spindles and telescoping over the adjacent portions of said driving shafts to permit longitudinal movement of said spring collars along with said longitudinal movement of said spindles, and detecting means for detecting the rearward movement of the spindle collars (17).

2. A hole machining device as set forth in claim 1, which includes means for driving said body at a controllable speed in forward and reverse directions, and wherein the detecting means are proximity switches (21) to shift the operation of the body (1) of the hole machining device from a forward movement to a slow forward movement or to a rearward movement.

3. A hole machining device as set forth in claim 1, wherein each of the spindles (10) consists of a reduced portion (11) and an enlarged portion (18), the reduced portions (11) being inserted in the tubular portions (7) at the front ends of the driving shafts (6), each of the reduced portions (11) having a position limiting bolt (13) inserted therein such that the bolt extends through the reduced portion (11) to prevent same from getting unscrewed forwardly from the tubular portion (7).

* * * * *